(12) United States Patent
Yamamoto

(10) Patent No.: US 12,030,727 B2
(45) Date of Patent: Jul. 9, 2024

(54) FILM FORMING SYSTEM, METHOD FOR CONTROLLING FILM FORMING SYSTEM, AND ARTICLE MANUFACTURING METHOD

(71) Applicant: CANON KABUSHIKI KAISHA, Tokyo (JP)

(72) Inventor: Takeshi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 17/540,016

(22) Filed: Dec. 1, 2021

(65) Prior Publication Data

US 2022/0185593 A1 Jun. 16, 2022

(30) Foreign Application Priority Data

Dec. 10, 2020 (JP) .................. 2020-205113

(51) Int. Cl.
  *B65G 43/08* (2006.01)
  *B65G 54/02* (2006.01)
  *C08J 5/18* (2006.01)

(52) U.S. Cl.
  CPC ............. *B65G 43/08* (2013.01); *B65G 54/02* (2013.01); *C08J 5/18* (2013.01)

(58) Field of Classification Search
  CPC ...... B65G 43/08; B65G 54/02; C03C 17/002; C03C 2218/34; C03C 2218/15; C08J 5/18
  See application file for complete search history.

(56) References Cited

U.S. PATENT DOCUMENTS

| | | | | |
|---|---|---|---|---|
| 6,106,631 A | * | 8/2000 | Inoue | ................... C23C 14/566 |
| | | | | 118/729 |
| 2018/0350648 A1 | * | 12/2018 | Klesen | .............. H01L 21/67715 |

FOREIGN PATENT DOCUMENTS

| | | |
|---|---|---|
| JP | 2019518863 A | 7/2019 |
| JP | 2020028212 A | 2/2020 |

* cited by examiner

*Primary Examiner* — Yuechuan Yu
(74) *Attorney, Agent, or Firm* — Canon U.S.A., Inc. I.P. Division

(57) ABSTRACT

A film forming system includes a conveyance carrier configured to hold a substrate and a mask and move inside a conveyance path, the substrate including a film formation area, the mask being configured to shield a film non-formation area other than the film formation area, a conveyance unit disposed on the conveyance path and configured to move the conveyance carrier in a first direction and a second direction intersecting the first direction, a film formation unit located along the conveyance path and configured to form a film on the film formation area of the substrate, and a mask supply unit located along the conveyance path and configured to supply the conveyance carrier with the mask.

7 Claims, 14 Drawing Sheets

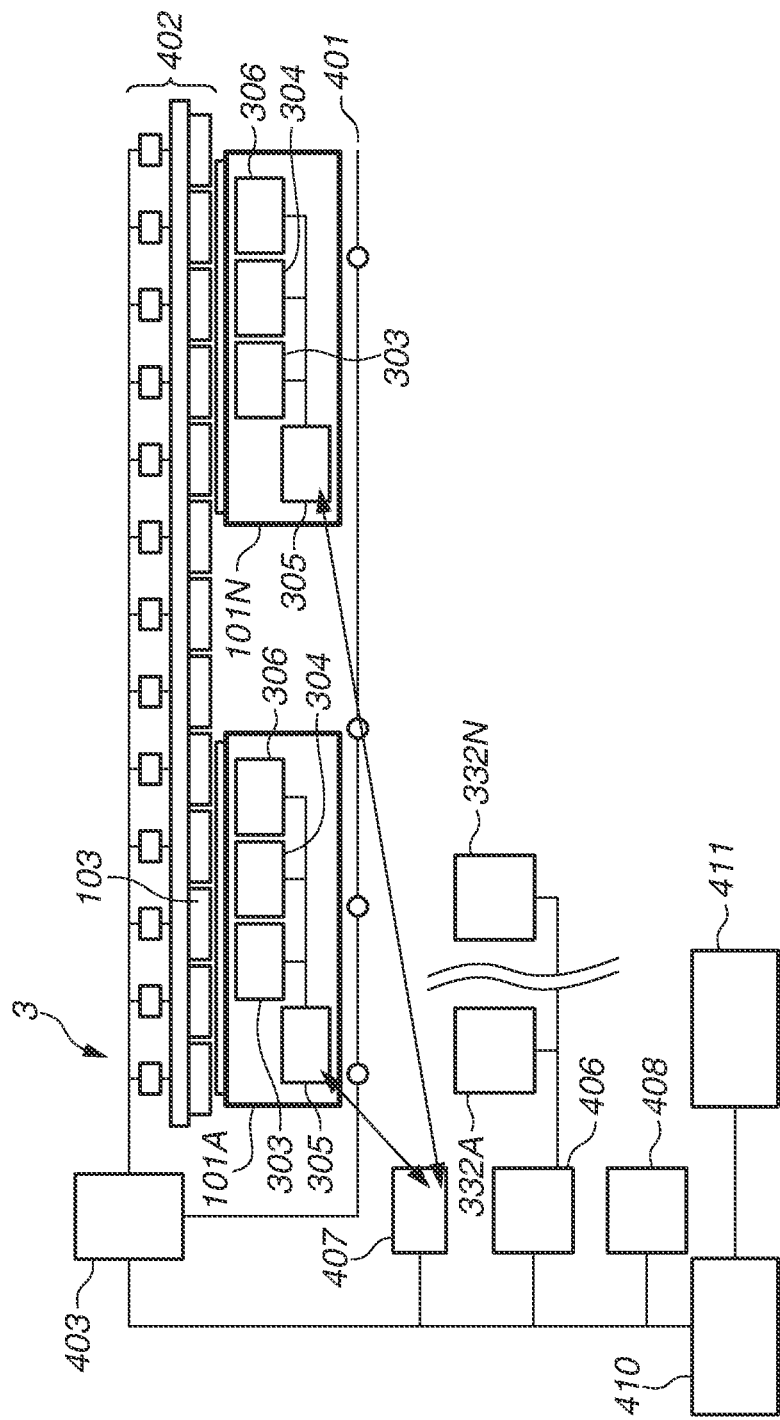

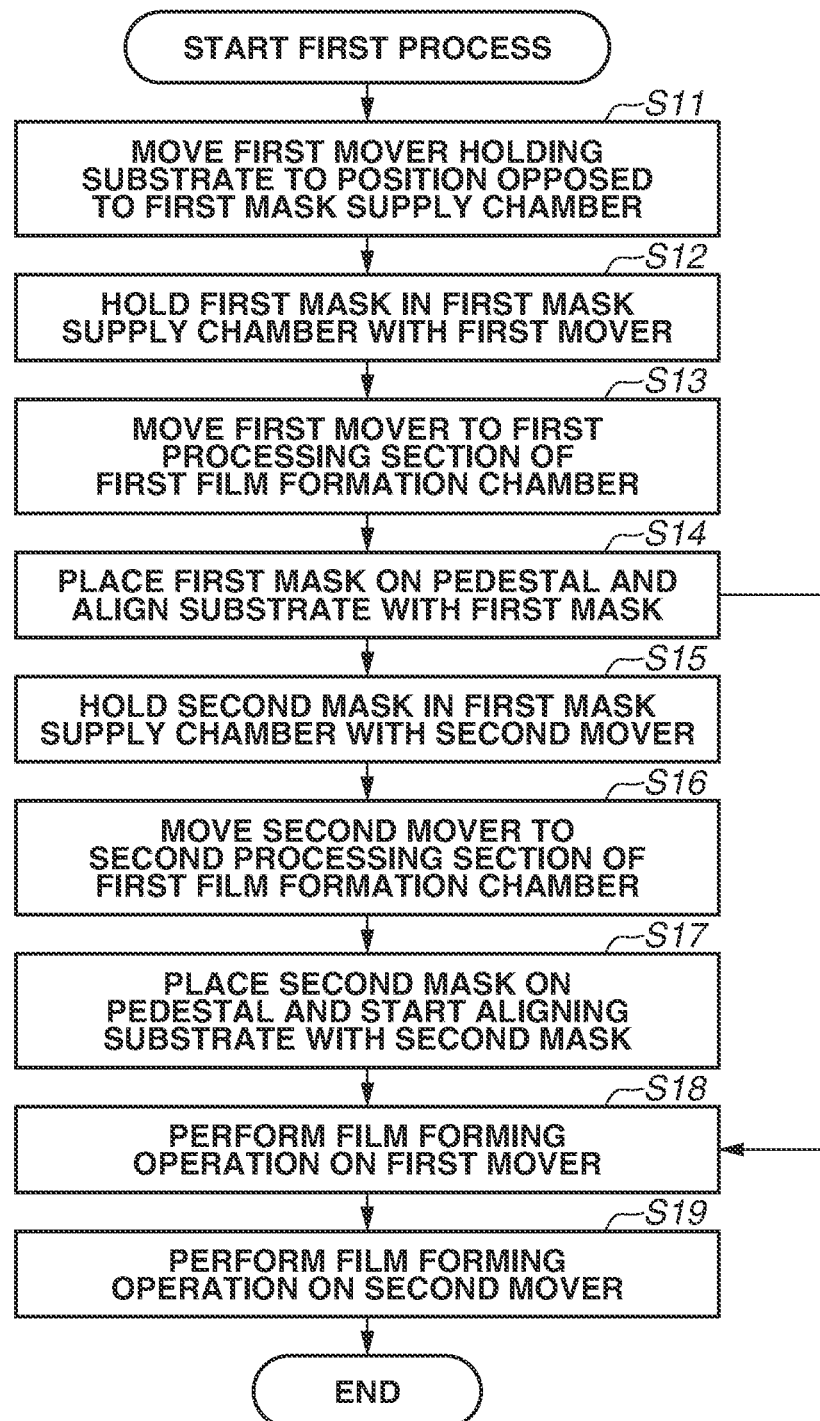

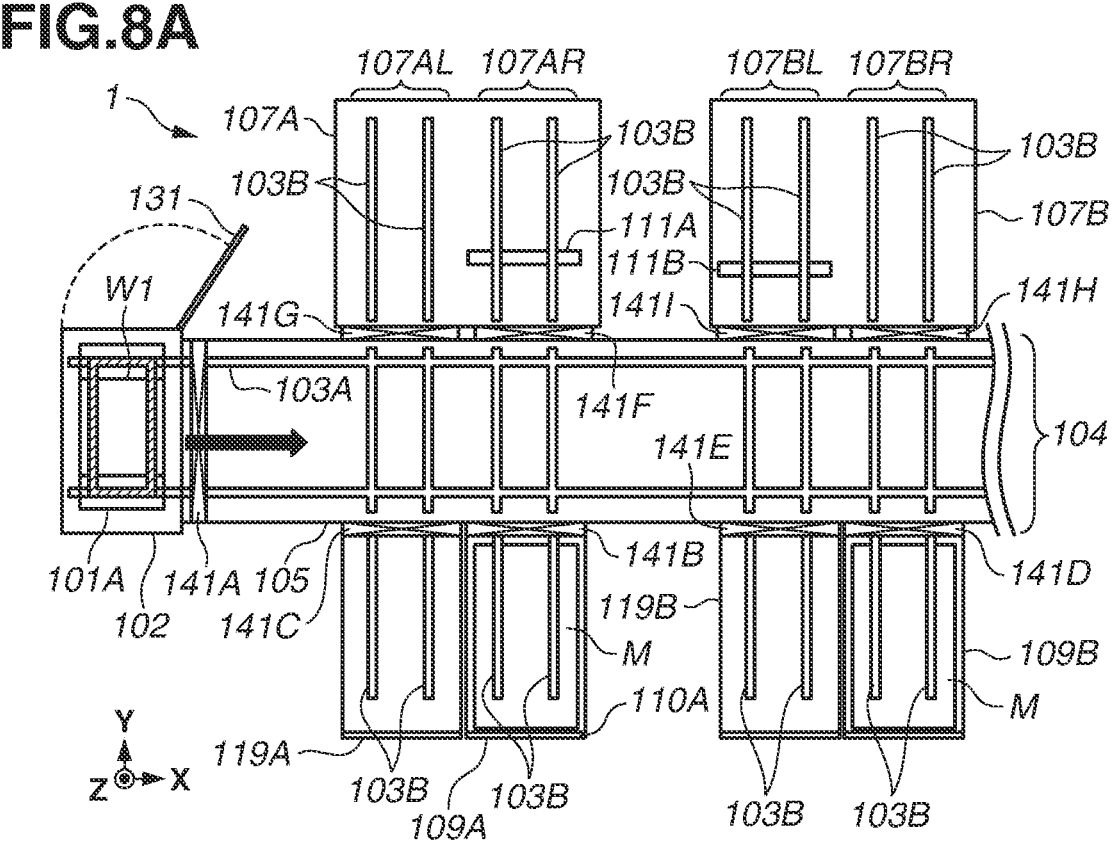
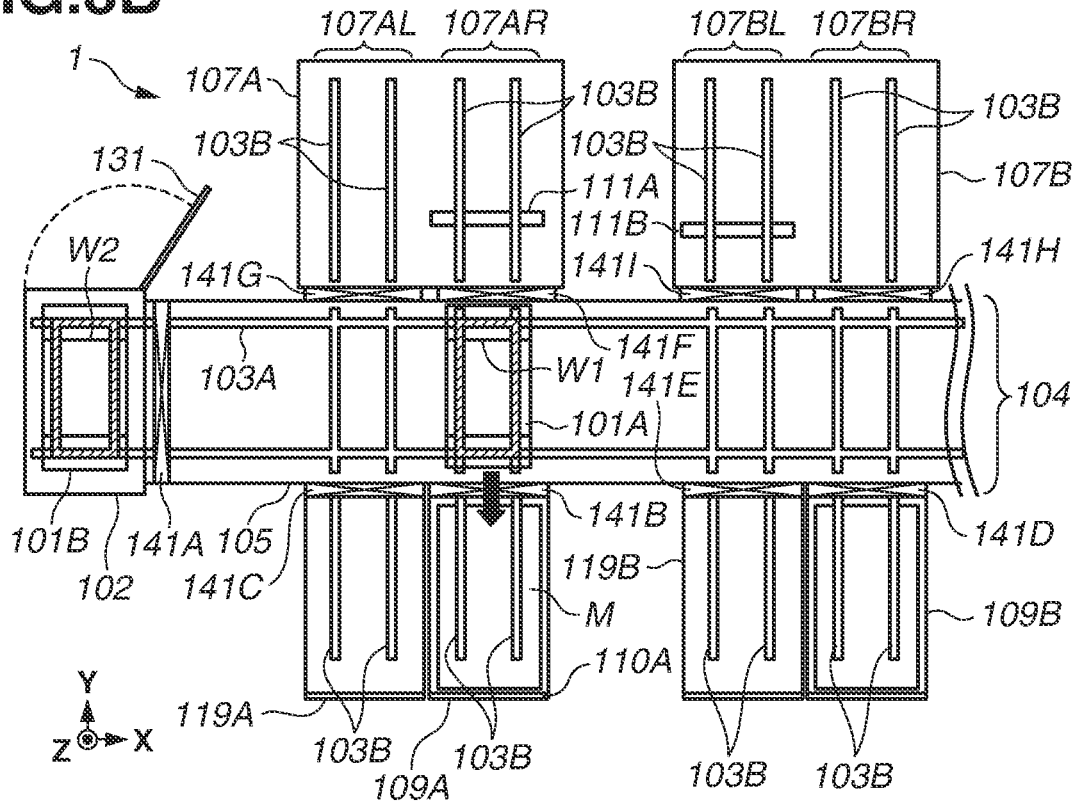

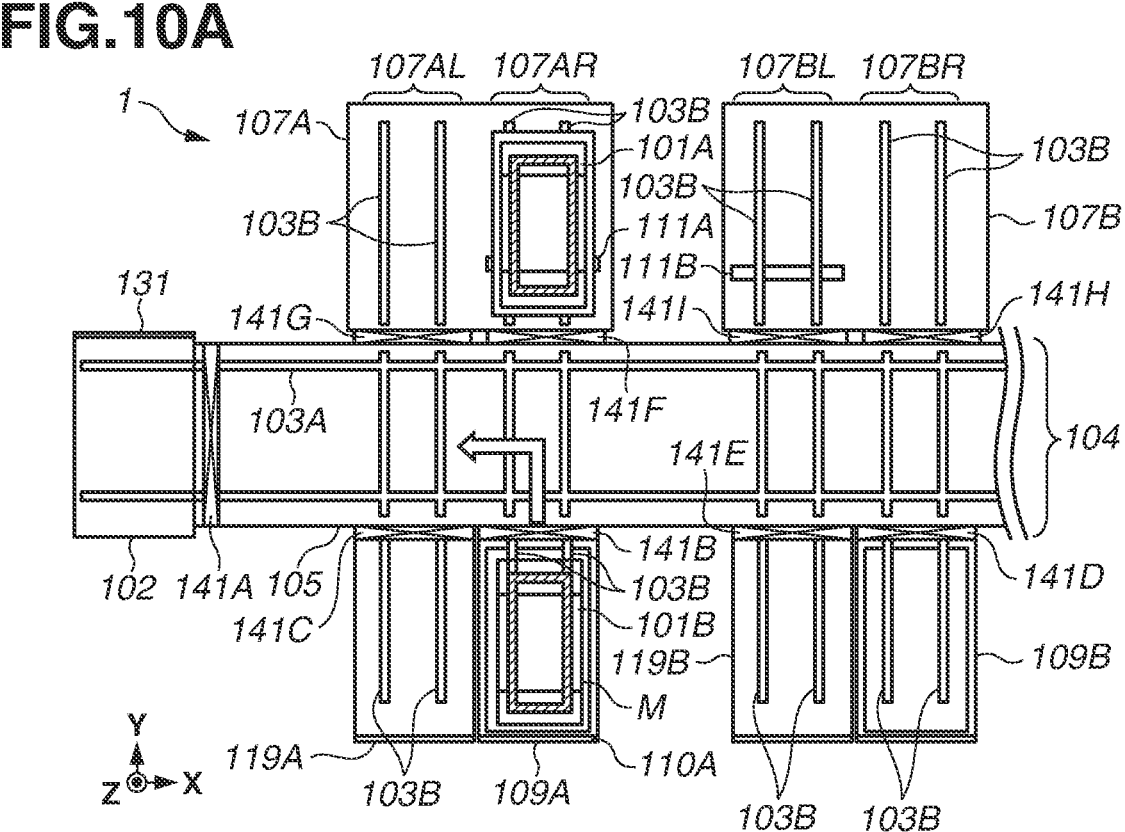
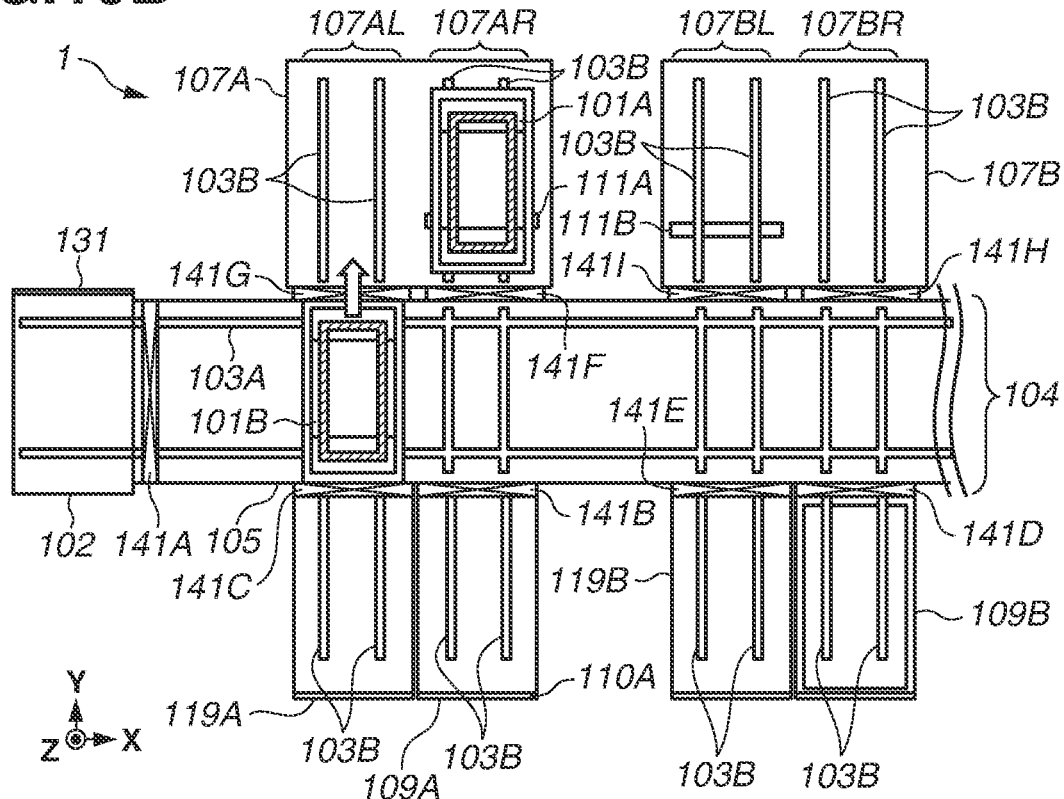

FILM FORMING SYSTEM, METHOD FOR CONTROLLING FILM FORMING SYSTEM, AND ARTICLE MANUFACTURING METHOD

BACKGROUND OF THE INVENTION

Field of the Invention

The present disclosure relates to a film forming system, a method for controlling a film forming system, and an article manufacturing method.

Description of the Related Art

An evaporation apparatus for forming a film by evaporating an evaporation material on a film formation target such as a glass substrate has heretofore been known. Specifically, an organic layer evaporation apparatus for evaporating an organic layer in manufacturing an organic electroluminescence (EL) display device (organic EL display) has been known. The organic EL display device is widely used not only for a smartphone, a television set, and an automotive display but also in application fields such as a virtual reality head-mounted display (VR-HMD). The organic layer evaporation apparatus includes a cluster evaporation apparatus and an inline evaporation apparatus. In an inline evaporation apparatus, a glass substrate for film formation is linearly conveyed, and a film is formed thereon in an evaporation chamber. Japanese Unexamined Patent Application Publication (Translation of PCT Application) No. 2019-518863 discusses a vacuum system for depositing (forming a film of) an organic material on a substrate.

However, processes performed by the apparatus discussed in Japanese Unexamined Patent Application Publication (Translation of PCT Application) No. 2019-518863 can be time consuming.

SUMMARY OF THE INVENTION

According to an aspect of the present disclosure, a film forming system includes a conveyance path extending in a first direction, a conveyance carrier configured to hold a substrate and a mask and move inside the conveyance path, the substrate including a film formation area, the mask being configured to shield a film non-formation area other than the film formation area, a conveyance unit disposed on the conveyance path and configured to move the conveyance carrier in the first direction and a second direction intersecting the first direction, a film formation unit located along the conveyance path and configured to form a film on the film formation area of the substrate, and a mask supply unit located along the conveyance path and configured to supply the conveyance carrier with the mask.

According to another aspect of the present disclosure, a film forming system includes a conveyance path extending in a first direction, a conveyance carrier configured to hold a substrate and/or a mask and move inside the conveyance path, the substrate including a film formation area, the mask being configured to shield a film non-formation area other than the film formation area, a conveyance unit disposed on the conveyance path and configured to move the conveyance carrier in the first direction and a second direction intersecting the first direction, a film formation unit located along the conveyance path and configured to form a film on the film formation area of the substrate, and a mask supply unit configured to supply the conveyance carrier with the mask, the mask supply unit being located along the conveyance path and opposed to the film formation unit.

According to yet another aspect of the present disclosure, a method for controlling a film forming system including a conveyance path extending in a first direction, a first conveyance carrier configured to hold a substrate and a mask and move inside the conveyance path, the substrate including a film formation area, the mask being configured to shield a film non-formation area other than the film formation area, a conveyance unit disposed on the conveyance path and configured to move the first conveyance carrier in the first direction and a second direction intersecting the first direction, a film formation unit located along the conveyance path and configured to form a film on the film formation area of the substrate, a mask supply unit located along the conveyance path and configured to supply the first conveyance carrier with the mask, and a control unit, includes conveying, by the control unit, the first conveyance carrier holding the substrate to the mask supply unit, causing, by the control unit, the first conveyance carrier to hold the mask in the mask supply unit, conveying, by the control unit, the first conveyance carrier holding the substrate and the mask to the film formation unit, and forming, by the control unit, a film on the film formation area of the substrate held by the first conveyance carrier via the mask in the film formation unit.

Further features of the present disclosure will become apparent from the following description of exemplary embodiments with reference to the attached drawings.

BRIEF DESCRIPTION OF THE DRAWINGS

FIG. 6 is a schematic diagram illustrating a control system according to the first exemplary embodiment.

FIG. 7 is a flowchart of film formation processes using the film forming system according to the first exemplary embodiment.

FIG. 8A is a schematic diagram illustrating a film formation process using the film forming system according to the first exemplary embodiment.

FIG. 8B is a schematic diagram illustrating a film formation process using the film forming system according to the first exemplary embodiment.

FIG. 10A is a schematic diagram illustrating a film formation process using the film forming system according to the first exemplary embodiment.

FIG. 10B is a schematic diagram illustrating a film formation process using the film forming system according to the first exemplary embodiment.

DESCRIPTION OF THE EMBODIMENTS

Figure 1:
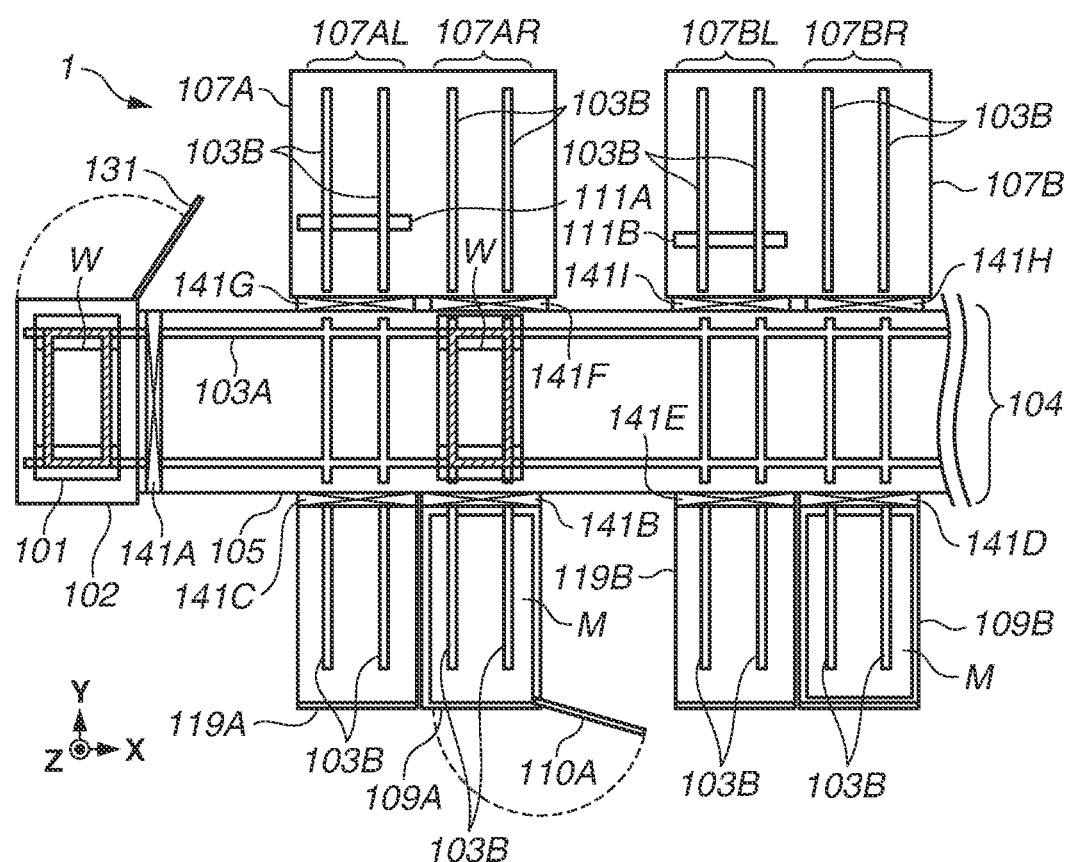
FIG. 1 is a schematic diagram illustrating a film forming system according to a first exemplary embodiment.

A film forming system 1 according to a first exemplary embodiment will be described with reference to the drawings.

Some components can exist in plural, such as movers 101, stator groups 103, and film formation chambers 107. Such components will hereinafter be denoted by common reference numerals if no particular distinction is needed. The individual components are each distinguished by a reference numeral accompanied by an uppercase letter as appropriate.

First, coordinate axes and directions used in the following description will be defined. An X-axis is in a horizontal direction that is a conveyance direction of the movers 101. The conveyance direction of the movers 101 is referred to as an X direction. A Z-axis is in a vertical direction that is a direction orthogonal to the X direction. The vertical direction is referred to as a Z direction. The vertical direction is the gravitational direction (mg direction). A Y-axis is in a direction orthogonal to the X and Z directions. The direction orthogonal to the X and Z directions is referred to as a Y direction. A direction of rotation about the X-axis is referred to as a Wx direction, a direction of rotation about the Y-axis is referred to as a Wy direction, and a direction of rotation about the Z-axis is referred to as a Wz direction.

Although the conveyance direction of the movers 101 does not necessarily need to be horizontal, even in such a case, the Y and Z directions can be similarly defined with the conveyance direction as the X direction. The X, Y, and Z directions are not necessarily limited to mutually orthogonal directions, and can be defined as mutually intersecting directions.

FIG. 1 is a schematic diagram illustrating a film forming system according to a first exemplary embodiment.

The film forming system 1 includes the movers 101 that are conveyance carriers, and a conveyance section where the movers 101 can move. The conveyance section includes a load lock chamber 102, a conveyance path 104, film formation chambers (film formation units) 107, mask supply chambers (mask supply units) 109, and mask discharge chambers (mask discharge units) 119. The load lock chamber 102, the film formation chambers 107, the mask supply chambers 109, and the mask discharge chambers 119 are connected to the conveyance path 104 via a gate valve or valves 141 each.

Movers

Figure 2A:
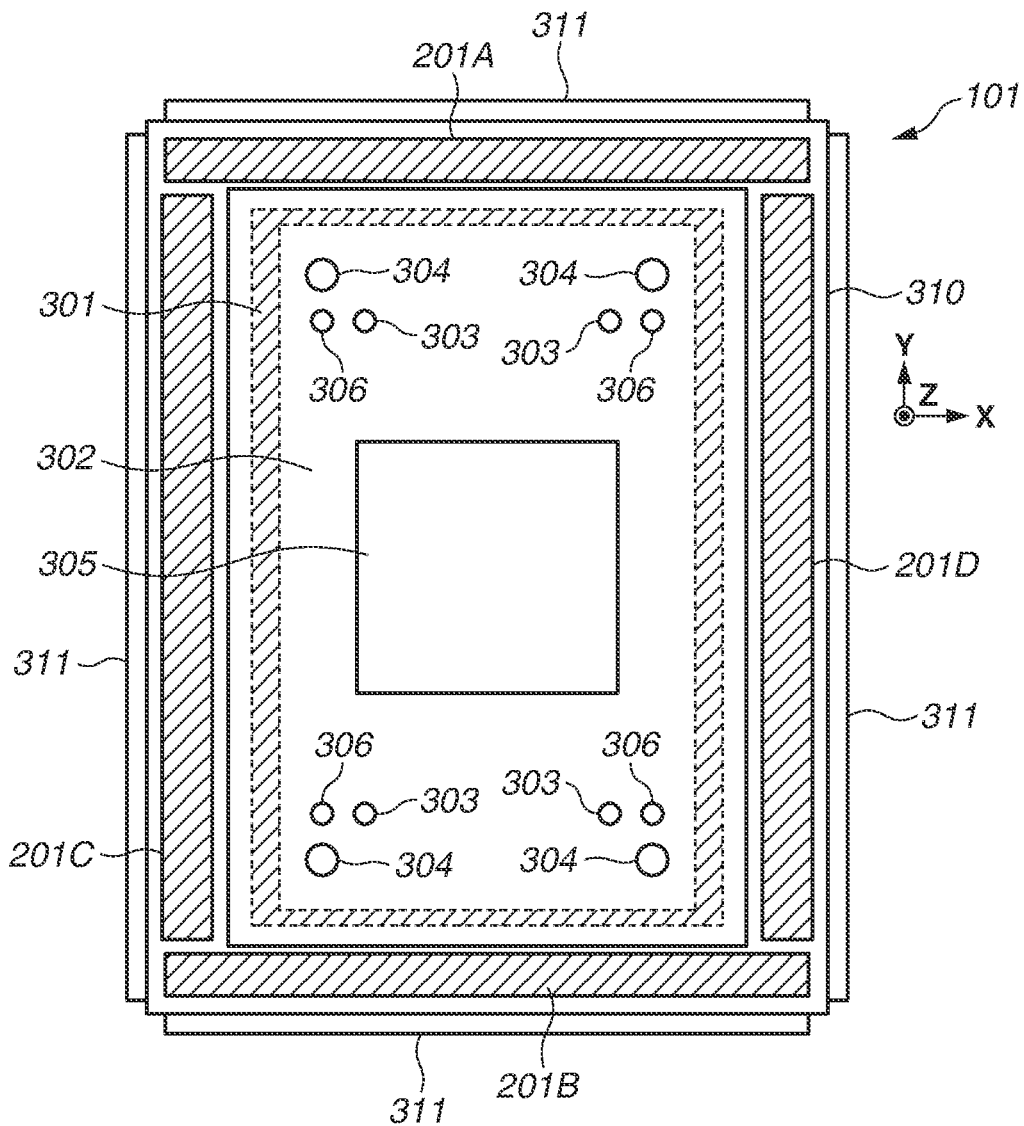
FIG. 2A is a schematic diagram illustrating a mover according to the first exemplary embodiment.
Figure 2B:
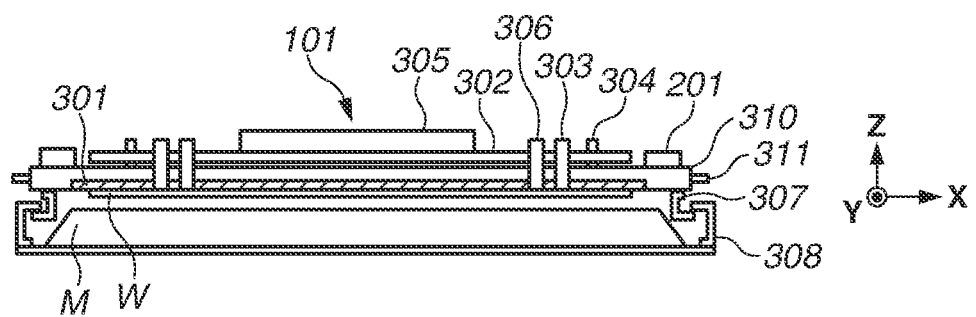
FIG. 2B is a schematic diagram illustrating the mover according to the first exemplary embodiment.

FIGS. 2A and 2B are schematic diagrams each illustrating a mover 101. FIG. 2A is a top view of the mover 101 seen in the Z direction. FIG. 2B is a side view of the mover 101 seen in the Y direction.

The mover 101 is a conveyance carrier that can move inside the conveyance path 104. The mover 101 being a conveyance carrier includes a base 310. Magnetic members 201 are disposed on the top surface of the base 310. For example, each of the magnetic members 201 is at least either a permanent magnet group including a plurality of permanent magnets or a ferromagnetic body. The magnetic members 201 include magnetic members 201A, 201B, 201C, and 201D. The magnetic members 201A to 201D and the stator groups 103 exert electromagnetic force on each other.

The magnetic members 201 include first magnetic members and second magnetic members. The magnetic members 201A and 201B that are the first magnetic members are located in the X direction. The magnetic members 201C and 201D that are the second magnetic members are located in the Y direction. In other words, the magnetic members 201 are arranged on the four sides of the mover 101. In FIG. 2A, the number of magnetic members 201 disposed on the top surface of the mover 101 is four. However, the number of magnetic members 201 and arrangement thereof are not limited to such a configuration. The number of magnetic members 201 and the arrangement thereof may be such that at least the position of the mover 101 can be controlled in the X and Y directions by an electromagnetic force occurring between the magnetic members 201 and the stator groups 103. Thus, the number of first magnetic members and the number of second magnetic members may be at least one each. Desirably, the position of the mover 101 is also controllable in the Z direction by the electromagnetic force occurring between the magnetic members 201A to 201D and the stator groups 103. The position control in the Z direction will be described below with reference to FIG. 3.

The mover 101 includes an electrostatic chuck 301 disposed on the bottom surface of the base 310. The electrostatic chuck 301 can hold a substrate W that is a work and can maintain the flatness of a film formation surface of the substrate W by producing an attractive force between the substrate W and the electrostatic chuck 301. With the flatness of the film formation surface maintained, alignment errors can be reduced, and the quality of the formed film can be improved. An example of the substrate W is a glass substrate. Non-glass materials such as a polymeric material and a metal may be selected. A glass substrate with a film of polyimide or the like stacked thereon may be used. The electrostatic chuck 301 can produce an electrostatic force from power supplied from a mover controller 305 to be described below and hold the substrate W in close contact therewith. The means by which the mover 101 holds the substrate W is not limited to the electrostatic chuck 301, and may be any configuration that horizontally holds the substrate W. A conventional technique may be used for substitution. Since the mover 101 conveys the substrate W that is horizontally held, the substrate W can be aligned with a mask M in a short time.

The mover 101 can hold not only the substrate W but also a mask M at the same time. Since the mover 101 simultaneously conveys the substrate W and the mask M, the film forming system 1 can perform film formation processes in a shorter time than heretofore. Moreover, the film formation chambers 107, the mask supply chambers 109, and the conveyance path 104 can be reduced in size since a substrate conveyance robot or mask conveyance robot does not need to be added. The mask M functions to shield a film non-formation area, which is other than a film formation area, of the substrate W in forming a film on the substrate W. The mask M can have various opening patterns (mask patterns) depending on the shape of the film (organic layer) to be formed. The mask M is made of a magnetic body, for example.

The mover 101 includes a permanent magnet plate 302 on the top side of the base 310. The permanent magnet plate 302 exerts an attractive force on the mask M made of a magnetic body and thereby brings the mask M into close contact with the substrate W. Actuators 304 are disposed on the top surface of the base 310, and the permanent magnet plate 302 can be moved in the Z direction by the actuators 304. The mover 101 is configured so that if the permanent magnet plate 302 is located far from the mask M, the attractive force acting between the permanent magnet plate 302 and the mask M falls below the gravitational force acting on the mask M. The mover 101 is also configured so that if the permanent magnet plate 302 is located close to the mask M, the attractive force acting between the permanent magnet plate 302 and the mask M exceeds the gravitational force acting on the mask M. Whether to bring the mask M into close contact with the substrate W can thus be controlled at desired timing.

The mover 101 includes alignment scopes 303. The alignment scopes 303 capture images of alignment marks (not illustrated) formed on both the mask M and the substrate W, and transmit the image data to the mover controller 305. The mover controller 305 detects amounts of misalignment between the substrate W and the mask M in the X and Y directions with reference to the alignment scopes 303 from the received image data. The detected amounts of misalignment are transmitted from the mover controller 305 to an integrated controller 410.

The mover 101 includes gap sensors 306 at positions adjacent to the alignment scopes 303. The gap sensors 306 detect the position of the mask M in the Z direction. With the substrate W in close contact with the electrostatic chuck 301, the distance between the substrate W and the mask M can be calculated from measurement values of the gap sensors 306 since the electrostatic chuck 301 is fixed to the mover 101.

The mover 101 includes the mover controller 305. The mover controller 305 collects the image data and the measurement results from the alignment scopes 303 and the gap sensors 306. The mover controller 305 can supply power to the electrostatic chuck 301 so that the electrostatic chuck 301 can stably attract the substrate W. The mover controller 305 can also issue driving commands to the actuators 304 and can control the position of the permanent magnet plate 302 with respect to the mask M and the substrate W.

The mover 101 includes mask hooks 307 on lateral sides with respect to the traveling direction of the base 310. The mask hooks 307 are shaped to be engageable with mask brackets 308 to which the mask M is fixed.

Figure 3:
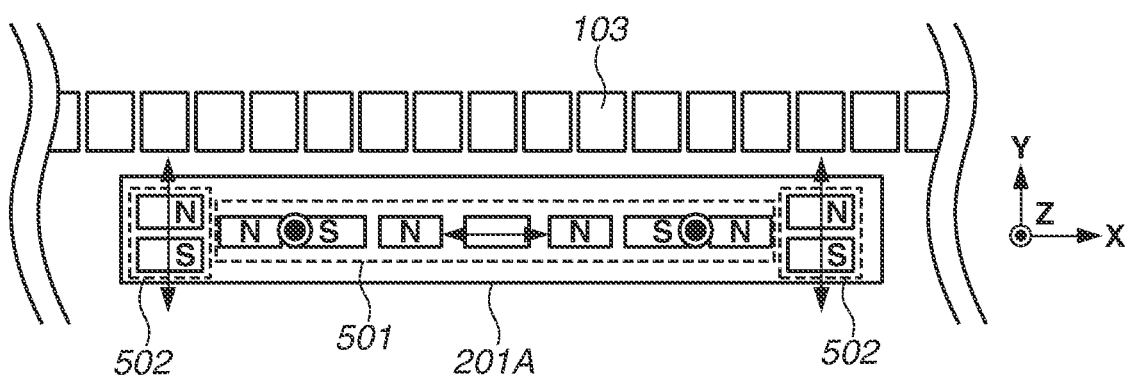
FIG. 3 is a partial enlarged view of the film forming system according to the first exemplary embodiment.

FIG. 3 is a partial view of the film forming system 1 with an emphasis on the magnetic member 201A of the mover 101 and a stator group 103. An example of means for controlling the position of the mover 101 in the Z direction by using an electromagnetic force occurring between the magnetic members 201 and the stator groups 103 will be described with reference to FIG. 3. Details of the means are also discussed in Japanese Patent Application Laid-Open No. 2020-28212 of which the present inventor is the inventor.

The magnetic member 201A, which is a first magnetic member, includes a first permanent magnet group 501 and second permanent magnet groups 502. The first permanent magnet group 501 includes a plurality of first permanent magnets arranged in the X direction with adjoining poles in opposite polarities. The second permanent magnet groups 502 each include a plurality of second permanent magnets arranged in the Y direction with adjoining poles in opposite polarities. The magnitudes of forces occurring on the mover 101 in the X, Z, and Wy directions can be controlled by controlling values of currents given to coils of the stator group 103 (first stator group 103A) opposed to the first permanent magnet group 501. The magnitude of a force occurring on the mover 101 in the Y direction can be controlled by controlling the values of the currents given to the coils of the stator group 103 (first stator group 103A) opposed to the second permanent magnet groups 502. In other words, the magnetic member 201A enables control of the forces on the mover 101 in the X, Y, Z, and Wy directions.

The magnitudes of forces on the magnetic member 201C, which is a second magnetic member, in the four directions of X, Y, Z, and Wx directions can also be controlled by arranging a first permanent magnet group and second permanent magnet groups as in the magnetic member 201A and controlling values of currents given to coils of a stator group 103 (second stator group 103B). In other words, with the magnetic members 201A and 201C combined, the forces on the mover 101 in the six directions of X, Y, Z, Wx, Wy, and Wz directions can be independently controlled.

Since the mover 101 is capable of such six-axis control, the mover 101 can be moved inside the film forming system 1 along the stator groups 103, and can be operated for six-axis alignment in the film formation chambers 107.

Conveyance Unit

The load lock chamber 102 includes a stator group 103 and a door 131. The load lock chamber 102 is connected to the conveyance path 104 via the gate valve 141A. With the door 131 open, the substrate W is conveyed into the load lock chamber 102 by a not-illustrated conveyance apparatus. The substrate W is attracted to the electrostatic chuck 301 of the mover 101 that is on standby in the load lock chamber 102. The load lock chamber 102 includes the stator group 103A extending in the X direction at a position where the magnetic members 201A and 201B of the mover 101 can be opposed to. While, in FIG. 1, the load lock chamber 102 is located in the X direction with respect to the conveyance path 104, the load lock chamber 102 may be located in the Y direction. After the door 131 is closed, the mover 101 is conveyed in the X direction by an electromagnetic force occurring between the mover 101 and the stator group 103. With the gate valve 141A opened, the mover 101 can enter the conveyance path 104.

The conveyance path 104 includes the stator groups 103 and is disposed so that a longitudinal direction thereof is in the X direction. In other words, the conveyance path 104 extends in the X direction that is a first direction. The stator groups 103 include a first stator group and second stator groups. The stator group 103A that is the first stator group includes a plurality of first coils arranged in the X direction at predetermined distances. The stator group 103A is located at a position where the stator group 103A can face the magnetic members 201A and 201B that are the first magnetic members of the mover 101. In FIG. 1, the stator group 103A that is the first stator group includes two stators disposed at a predetermined distance in the Y direction. The number of stators in the stator group 103A is not limited to two and may be one or three or more depending on the number of magnetic members of the mover 101. The stator groups 103B that are the second stator groups include a plurality of second coils arranged in the Y direction at predetermined distances. The stator groups 103B are located at positions where the stator groups 103B can face the magnetic members 201C and 201D that are the second magnetic members of the mover 101. In FIG. 1, there are four stator groups 103B that are second stator groups. Each of the stator groups 103B includes two stators disposed at a predetermined distance in the X direction. The number of stators in each of the stator groups 103B is not limited to two and may be one or three or more depending on the number of magnetic members of the mover 101. The plurality of first coils and the plurality of second coils may include a core each. As employed herein, a coil may be referred to as an armature. The stator groups 103 apply a conveying force to the mover 101 in a direction where the stator groups 103 extend (direction where coils are arranged) by applying currents to a plurality of coils. The stator groups 103 also apply a levitation force to the mover 101 in the Z direction with respect to the stator group 103. The stator groups 103 include position and orientation sensor groups 401 each including a plurality of linear encoders. The linear encoders detect a relative position of the mover 101 with respect to the linear encoders by reading a not-illustrated linear scale attached to the mover 101.

As illustrated in FIG. 1, the conveyance path 104 includes locations (intersections) where the stator group 103A extending in the X direction and the stator groups 103B extending in the Y direction intersect. If the mover 101 being conveyed in the X direction reaches an intersection, the stator group 103B and the magnetic member 201C, and the stator group 103B and the magnetic member 201D, exert electromagnetic force on each other. This enables the mover 101 to move not only in the X direction but also in the Y direction.

The film formation chambers 107 form a film on the film formation surface (film formation area) of the substrate W conveyed by the mover 101. The substrate W and the mask M are aligned before film formation. Each film formation chamber 107 includes stator groups 103B and an evaporation source 111. A film formation chamber 107A is connected to the conveyance path 104 via gate valves 141F and 141G. A film formation chamber 107B is connected to the conveyance path 104 via gate valves 141H and 141I. The evaporation source 111 includes a crucible containing an evaporation material, a heat source, and a shutter. The film formation method is not limited to evaporation, and sputtering using a metal target instead of an evaporation source may be employed. In FIG. 1, each film formation chamber 107 includes two stator groups 103B and can accommodate two movers 101. The right half of each film formation chamber 107 in FIG. 1 will be referred to as a first processing section 107R, and the left half will be referred to as a second processing section 107L, while no partition is particularly needed inside the film formation chamber 107. The first and second processing sections 107R and 107L have similar functions. Both the first and second processing sections 107R and 107L are capable of film formation. The substrate W can be aligned with the mask M in either of the first and second processing sections 107R and 107L.

Figure 4:
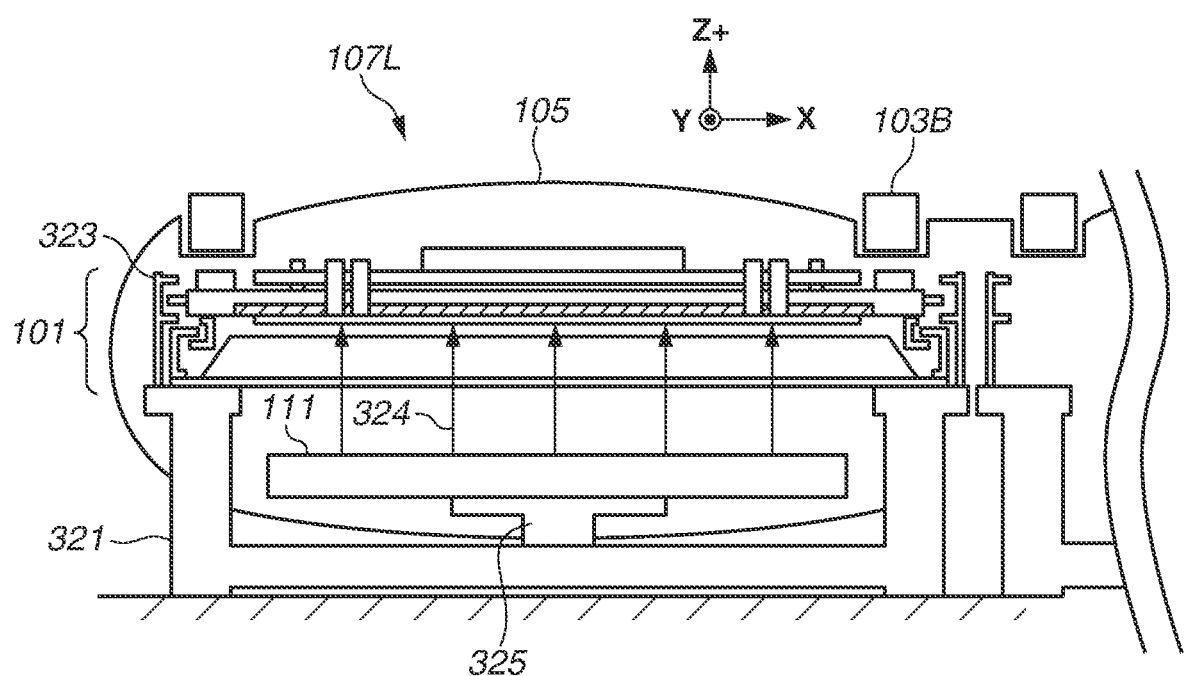
FIG. 4 is a schematic diagram illustrating a film formation chamber according to the first exemplary embodiment.

FIG. 4 is a schematic sectional view of the second processing section 107L of the film formation chamber 107 seen in the Y direction. Although omitted in FIG. 4, the first processing section 107R has a similar configuration. The second processing section 107L includes a vacuum vessel 105. In FIG. 4, the mover 101, the evaporation source 111, brackets 323, an actuator 325, and a part of a pedestal 321 are located in the vacuum vessel 105. The second processing section 107L includes the pedestal 321 on which the mask M can be placed, and the evaporation source 111 that can be moved by the actuator 325 disposed on the pedestal 321. The evaporation source 111 can be moved not only in the Z direction but also in the Y and X directions in FIG. 4. The evaporation source 111 can also be moved into the first processing section 107R in the X direction.

The brackets 323 are disposed on the pedestal 321. The brackets 323 can regulate a moving range of the mover 101, and can catch the mover 101 if the power supply to the stator group 103B is stopped during film formation. The brackets 323 are equipped with a not-illustrated second position and orientation sensor group including a plurality of sensors. The second position and orientation sensor group can detect distances to sensor targets 311 of the mover 101 and read patterns on the sensor targets 311. The second position and orientation sensor group detects the position and orientation of the mover 101 by detecting the distances to the sensor targets 311 of the mover 101 and reading the patterns thereon, and transmits the detection results to the integrated controller 410.

The mask supply chamber 109A is connected to the conveyance path 104 via a gate valve 141B. The mask supply chamber 109B is connected to the conveyance path 104 via a gate valve 141D. The mask supply chambers 109 store unused masks M. The mask supply chambers 109 and the film formation chambers 107 are linearly arranged in the Y direction. In other words, the mask supply chambers 109 are opposed to the film formation chambers 107 with the conveyance path 104 therebetween. The opposite arrangement of the mask supply chambers 109 and the film formation chambers 107 can reduce the total moving distance of the mover 101 and reduce the time of the film formation processes. However, the mask supply chambers 109 are not limited to such an arrangement, and may be arranged to adjoin the film formation chambers 107 in the X direction.

Figure 5:
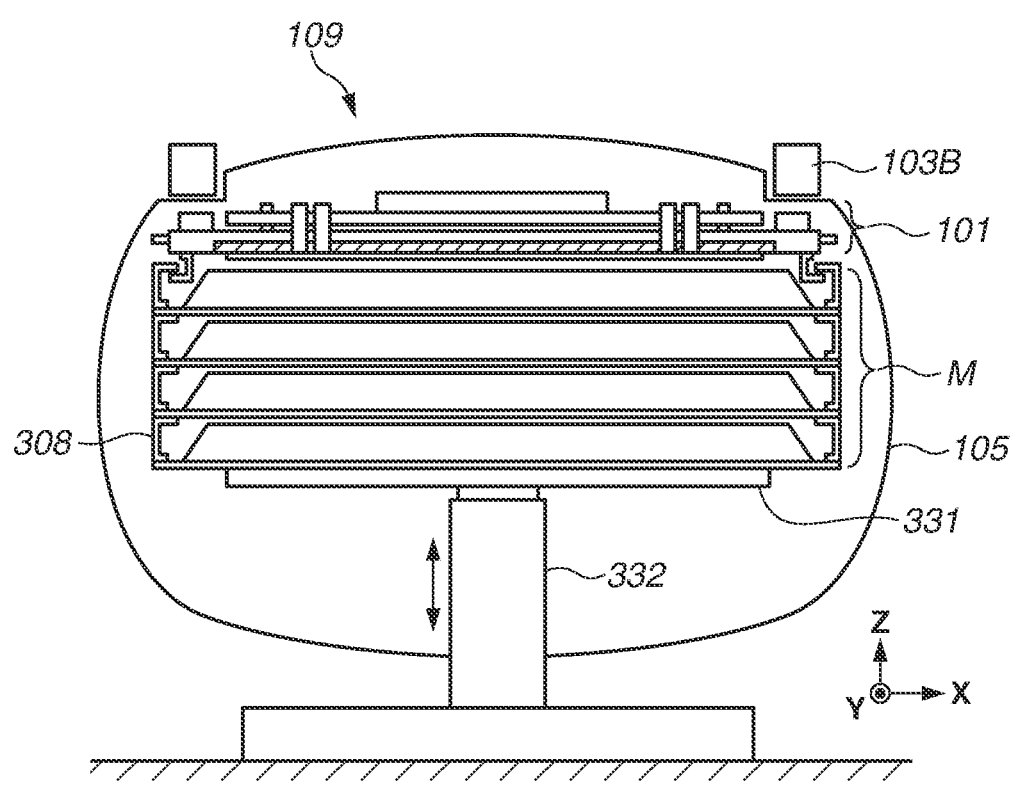
FIG. 5 is a schematic diagram illustrating a mask supply chamber according to the first exemplary embodiment.

FIG. 5 is a schematic sectional view of a mask supply chamber 109 seen in the Y direction. The mask supply chamber 109 includes a stator group 103B, a mask table 331 on which a plurality of masks M can be stacked, and a mask lift unit 332 that can move the mask table 331 up and down in the Z direction. The mask supply chamber 109 includes a vacuum vessel 105. In FIG. 5, the mover 101, four masks M, the mask table 331, and a part of the mask lift unit 332 are located in the vacuum vessel 105. In the mask supply chamber 109, the mask lift unit 332 moves in a +Z direction to move the topmost mask brackets 308 to a range where the mover 101 can move in the Z direction. Then, the mask hooks 307 of the mover 101 are engaged with the mask brackets 308, whereby the mover 101 can horizontally hold the unused mask M. If the number of masks M stored is small or zero, a door 110A is opened and masks M are conveyed for replenishment by a not-illustrated conveyance apparatus.

The mask discharge chambers 119 store used masks M. Since the mask discharge chambers 119 have a similar configuration to that of the mask supply chambers 109, an illustration thereof will be omitted. After a plurality of times of film formation, the movers 101 carry the used masks M used in the film formation chambers 107 to the mask discharge chambers 119, whereby the masks M are stored. The mask discharge chambers 119 and the film formation chambers 107 are linearly arranged in the Y direction. In other words, the mask discharge chambers 119 are opposed to the film formation chambers 107 with the conveyance path 104 therebetween. The opposite arrangement of the mask discharge chambers 119 and the film formation chambers 107 can reduce the total moving distance of the mover 101 and reduce the time of the film formation processes.

However, the mask discharge chambers 119 are not limited to such an arrangement, and may be arranged to adjoin the film formation chambers 107 in the X direction. If the number of masks M stored in a mask discharge chamber 119 reaches the maximum number of masks M that can be stored in the mask discharge chamber 119, a door is opened to remove the masks M. In the present exemplary embodiment, the mask discharge chambers 119 and the mask supply chambers 109 are independently disposed, but the mask supply chambers 109 may also function as the mask discharge chambers 119.

In FIG. 1, the film formation chamber 107 is opposed to the mask supply chamber 109 and the mask discharge chamber 119. With the three apparatuses as a unit, the layout area of the entire film forming system 1 can be reduced by continuously arranging a plurality of units in the X direction. In FIG. 1, the film formation chamber 107A, the mask supply chamber 109A, and a mask discharge chamber 119A constitute a unit (first unit). The film formation chamber 107B, the mask supply chamber 109B, and a mask discharge chamber 119B constitute a unit (second unit).

Control System

FIG. 6 is a schematic diagram illustrating a control system 3 that is a control unit for controlling operation of the film forming system 1.

The control system 3 includes a coil current control unit 402, a mover control unit 403, a mask supply chamber control unit 406, a mask discharge chamber control unit 408, a wireless transmission unit 407, the integrated controller 410, and a film formation controller 411.

The integrated controller 410 is mutually communicably connected with the film formation controller 411, the mask supply chamber control unit 406, the mask discharge chamber control unit 408, the mover control unit 403, and the wireless transmission unit 407. The integrated controller 410 controls conveyance of the movers 101 and operation of the mask supply chambers 109 and the mask discharge chambers 119 based on commands from the film formation controller 411.

The integrated controller 410 can transmit commands to the mask supply chamber control unit 406 to control the heights of the mask lift units 332 in the respective mask supply chambers 109. The movers 101 can engage with masks M controlled to desired heights and convey the masks M.

The integrated controller 410 can transmit commands to the mask discharge chamber control unit 408 to control the heights of mask lift units in the respective mask discharge chambers 119.

The mover control unit 403 calculates current values for controlling the positions and orientations of the movers 101 based on target positions of the movers 101 transmitted from the integrated controller 410 and position and orientation information about the movers 101 obtained from the position and orientation sensor groups 401. The integrated controller 410 instructs the coil current control unit 402 on the calculated current values. The coil current control unit 402 controls the amounts of current in the stator groups 103 based on the instructed current values. The currents applied to the stator groups 103 produce an electromagnetic force between the stator groups 103 and the opposed magnetic members 201 of the movers 101 to control the movers 101 to desired positions.

The wireless transmission unit 407 communicates with mover control units 403 mounted on the respective movers 101 to collect alignment error information and gap information between substrates W and the masks M, and notifies the integrated controller 410 of the alignment error information and the gap information. The integrated controller 410 generates new target positions of the movers 101 based on the alignment error information and the gap information collected, and notifies the mover control units 403 of the new target positions.

Alignment errors between the substrates W and the masks M can be sufficiently reduced by repeating the foregoing operations.

Conveyance Method

Subsequently, a substrate conveyance method using the film forming system 1 will be described. FIG. 7 is a flowchart illustrating the process of film formation on a substrate (first process) using the film forming system 1 according to the first exemplary embodiment. FIGS. 8A to 11 are schematic diagrams illustrating respective steps in the process of film formation.

First, a mover 101A that is a first mover or conveyance carrier is on standby in the load lock chamber 102. After the door 131 is opened, a substrate W1 is conveyed into the load lock chamber 102 by a not-illustrated conveyance apparatus. The conveyed substrate W1 is attracted to the mover 101A by the electrostatic chuck 301 of the mover 101A. The door 131 is closed, and then the gate valve 141A is opened. Currents are passed through the plurality of first coils of the stator group 103A extending in the X direction based on commands from the integrated controller 410. The mover 101A is conveyed in a +X direction by the electromagnetic force occurring between the mover 101A and the stator group 103A, and enters the conveyance path 104 (FIG. 8A). The mover 101A here may be levitated off or in contact with the stator group 103A.

In step S11, the mover 101A holding the substrate W1 moves in the conveyance path 104 in the +X direction to reach a position opposed to the mask supply chamber 109A that is a first mask supply chamber (FIG. 8B). The conveyance path 104 includes not only the stator group 103A (first stator group) extending in the X direction but also the stator groups 103B (second stator groups) extending in the Y direction.

The mask supply chambers 109 also include stator groups 103B extending in the Y direction. The stator group 103A and a stator group 103B intersect at a position opposed to the mask supply chamber 109A. The mover 101A can change the traveling direction thereof from the X direction to the Y direction at the intersection. As illustrated in FIG. 8B, a mover 101B that is a second mover holding a substrate W2 may be here on standby in the load lock chamber 102.

Figure 9A:
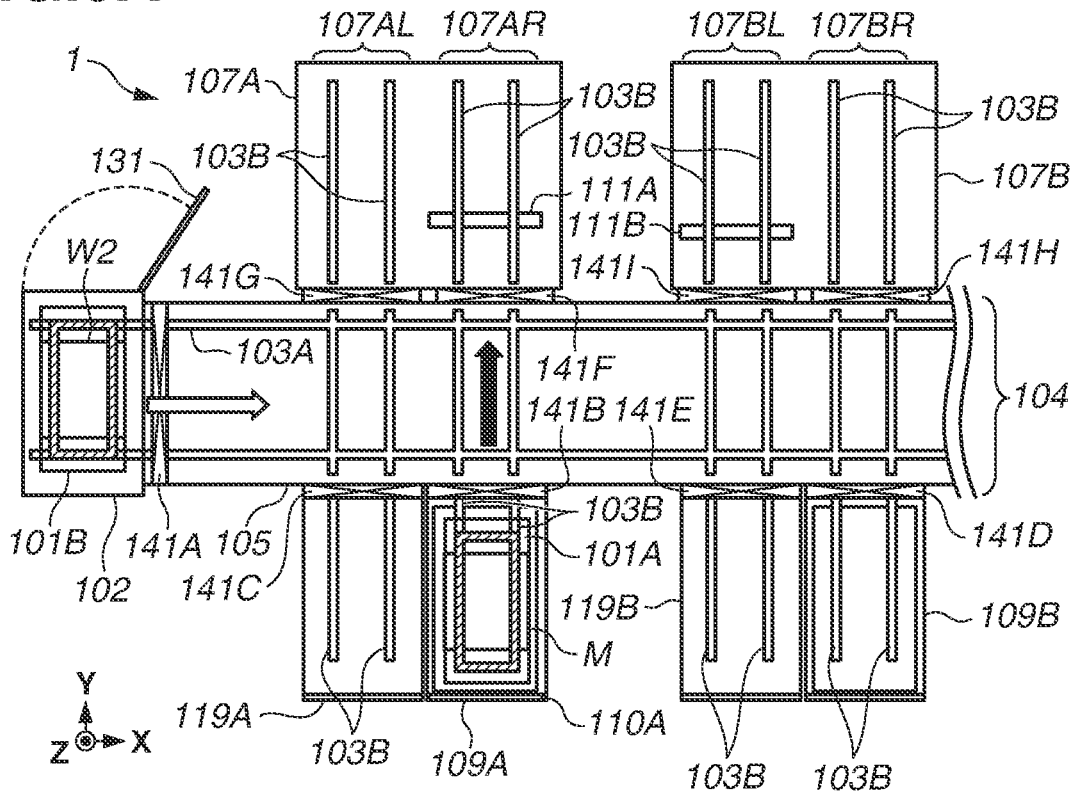
FIG. 9A is a schematic diagram illustrating a film formation process using the film forming system according to the first exemplary embodiment.

Next, the mover 101A holding the substrate W1 is conveyed in a −Y direction into the mask supply chamber 109A. The mask lift unit 332 of the mask supply chamber 109A illustrated in FIG. 5 moves the mask table 331 in the +Z direction to move the topmost mask brackets 308 to a range where the mover 101A can move in the Z direction. In step S12, the mask hooks 307 of the mover 101A are engaged with the mask brackets 308, whereby an unused mask M (first mask) is held by the mover 101A (FIG. 9A). Moreover, as illustrated in FIG. 9A, the second mover 101B holding the substrate W2 starts to move in the +X direction.

Then, the mover 101A holding the substrate W1 and the unused mask M is conveyed in a +Y direction into the film formation chamber 107A that is a first film formation chamber.

Figure 9B:
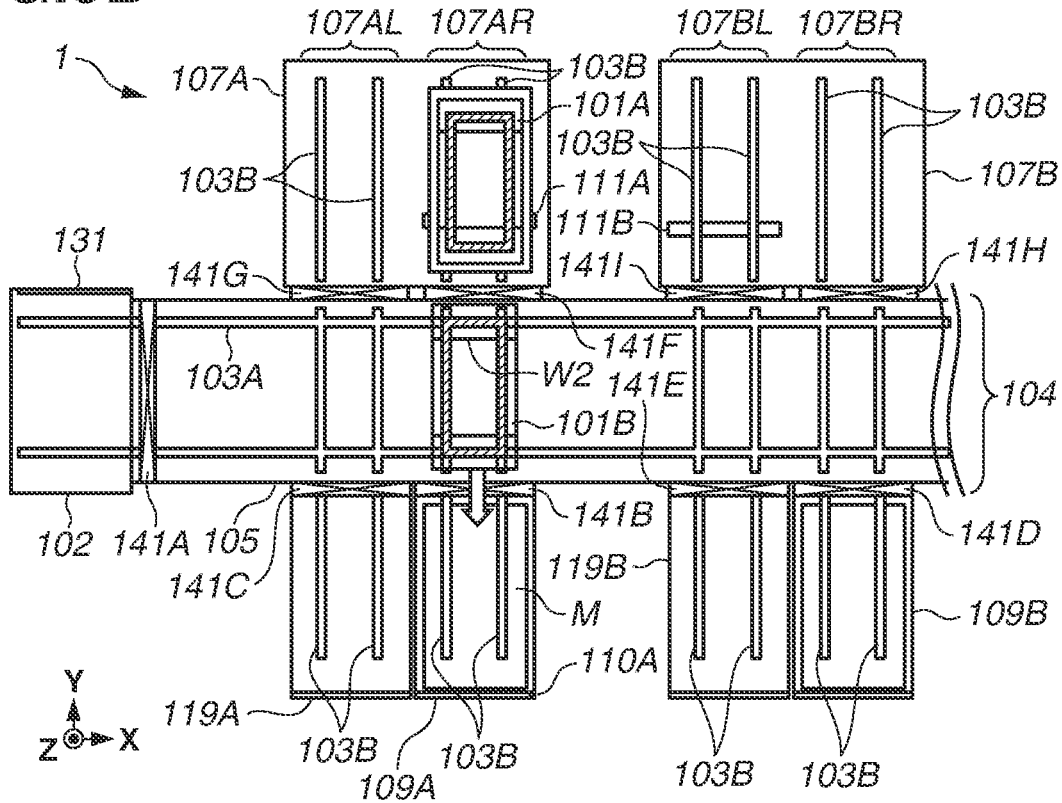
FIG. 9B is a schematic diagram illustrating a film formation process using the film forming system according to the first exemplary embodiment.

The first film formation chamber 107A is opposed to the mask supply chamber 109A with the conveyance path 104 therebetween. Thus, the mover 101A can be moved from the mask supply chamber 109A to the first film formation chamber 107A by only the electromagnetic force occurring between the mover 101A and the stator groups 103B. The first film formation chamber 107A includes a first processing section 107AR and a second processing section 107AL. In step S13, first, the mover 101A is moved to the first processing section 107AR (FIG. 9B). Moreover, as illustrated in FIG. 9B, the second mover 101B holding the substrate W2 is moved in the +X direction up to the position opposed to the mask supply chamber 109A for the purpose of being supplied with a mask M in the mask supply chamber 109A.

In the first processing section 107AR, the substrate W1 is aligned with the unused mask M. Specifically, in step S14, first, the mover 101A places the held mask M on the pedestal 321. The mover 101A is kept levitated to be not in contact with the pedestal 321 or the mask M. The mover controller 305 of the mover 101A collects the image data on the alignment scopes 303 and the measurement results of the gap sensors 306, and issues driving commands to the actuators 304 to control the position of the substrate W with respect to the mask M in the Z direction. The integrated controller 410 controls the position and orientation of the mover 101A based on the distances to the sensor targets 311 and the patterns on the sensor targets 311 detected/read by the not-illustrated second position and orientation sensor group disposed on the bracket 323.

In step S15, the second mover 101B is conveyed in the −Y direction into the first mask supply chamber 109A, and holds a mask M (second mask) (FIG. 10A). The procedure where the mover 101B is supplied with the mask M (second mask) in the first mask supply chamber 109A is similar to that where the mover 101A is supplied with the mask M (first mask) in the first mask supply chamber 109A.

In step S16, the mover 101B holding the substrate W2 and the unused mask M is moved to the second processing section 107AL of the first film formation chamber 107A (FIG. 10B). The mover 101B moves in the +Y direction in the mask supply chamber 109A and returns to the conveyance path 104. Here, the electromagnetic force acts between the stator groups 103B and the magnetic members 201C and 201D of the mover 101B.

Subsequently, the mover 101B moves in the conveyance path 104 in an −X direction up to a position opposed to the second processing section 107AL of the first film formation chamber 107A. Here, the electromagnetic force acts between the stator group 103A and the magnetic members 201A and 201B of the mover 101B. Subsequently, the mover 101B moves in the conveyance path 104 in the +Y direction again into the second processing section 107AL of the first film formation chamber 107A. In such a series of operations, the mover 101B may be levitated off or in contact with the stator groups 103A and 103B.

Figure 11:
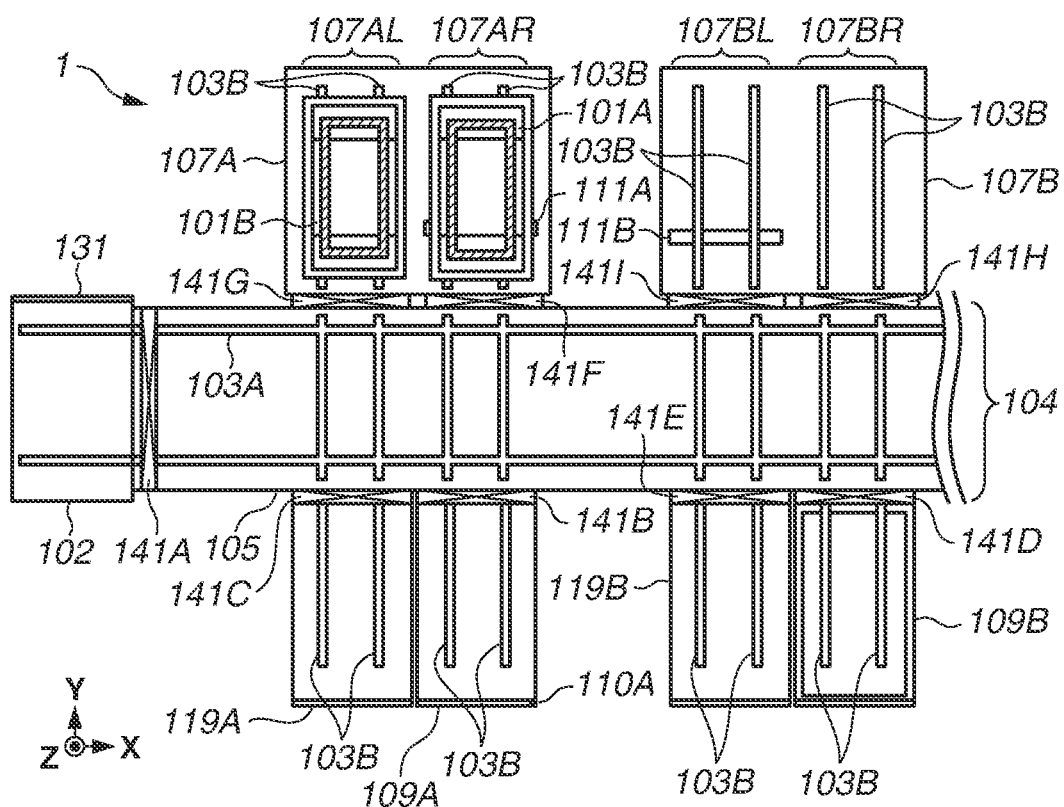
FIG. 11 is a schematic diagram illustrating a film formation process using the film forming system according to the first exemplary embodiment.

In step S17, the substrate W2 held by the mover 101B is aligned with the unused mask M in the second processing section 107AL (FIG. 11). An alignment operation is performed by a similar procedure to that with the mover 101A in step S14.

In step S18, a film forming operation is performed on the mover 101A while the mover 101B is performing the alignment operation. The film forming operation on the mover 101A is performed with the mover 101A being levitated from the pedestal 321 and the mask M. Here, the mover 101A desirably continues the alignment operation during the film formation. The reason is that repetition of the alignment operation by the mover 101A during the film formation can correct misalignment of the substrate W with the mask M due to temperature variations during the film formation. Since the film forming operation can be performed on one of the movers 101 while the other is performing the alignment operation, a series of film formation processes can be performed in a short time.

Subsequently, the evaporation source 111 moves in the −X direction from the first processing section 107AR to the second processing section 107AL. Then, in step S19, the film forming operation is performed on the mover 101B in the second processing section 107AL. The above is the description of the first process. In the present exemplary embodiment, while the film formation (step S18) on the substrate W1 held by the mover 101A is performed after step S107, the film formation may be started after the end of step S14.

Figure 12A:
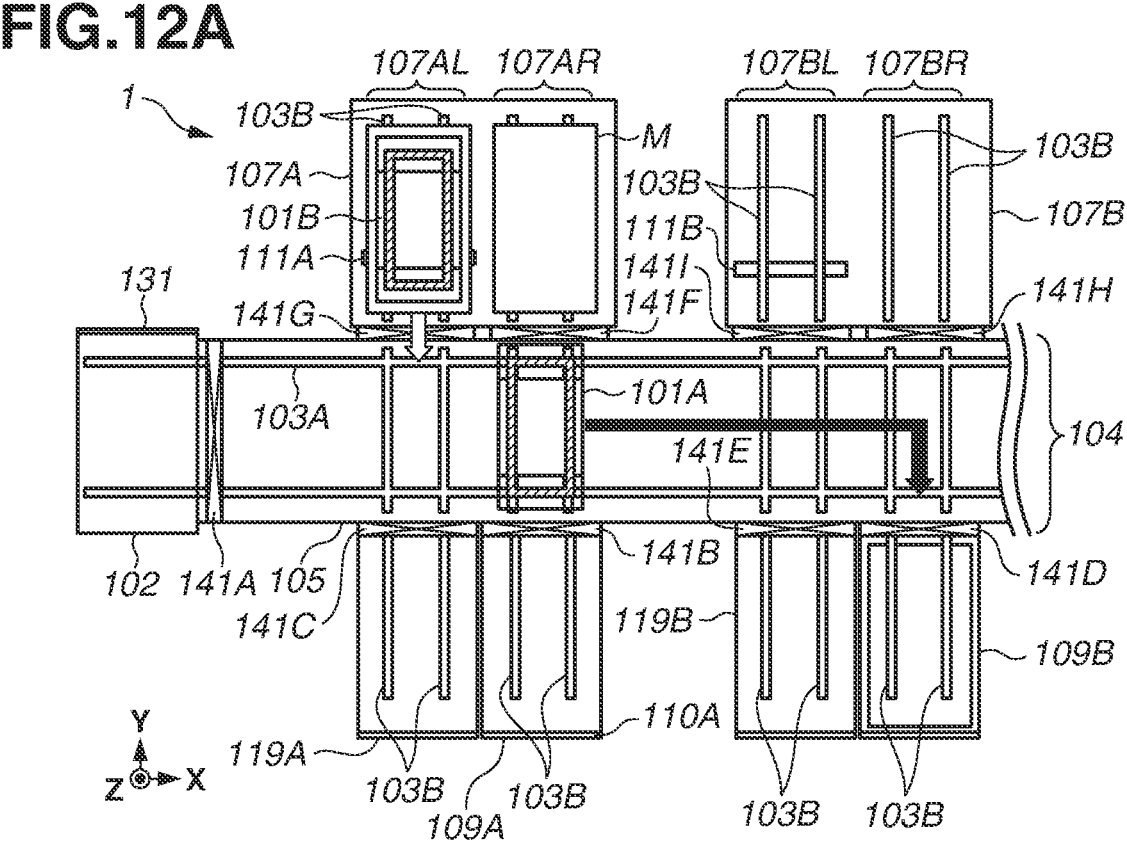
FIG. 12A is a schematic diagram illustrating a movement of a mover after the end of a film formation process.
Figure 12B:
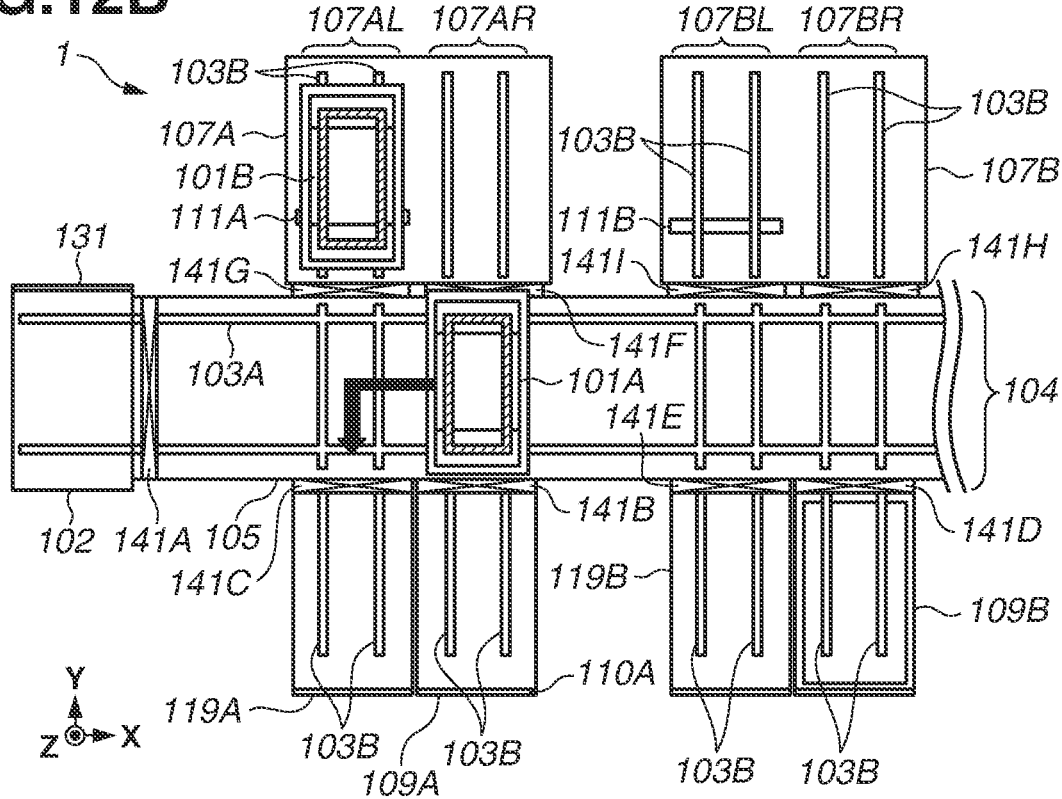
FIG. 12B is a schematic diagram illustrating a movement of the mover after the end of the film formation process.

The movement of the mover 101A after the end of the film forming operation in the first process differs depending on whether to reuse the mask M. The reason is that the mask M is collected for cleaning after the predetermined number of times of film formation. FIGS. 12A and 12B are schematic diagrams for describing the movement of the mover 101A after the end of the first process.

If the mask M is reused, the mover 101A is returned to the conveyance path 104 with the mask M left on the pedestal 321 of the first processing section 107AR (FIG. 12A). Leaving the mask M in the first processing section 107AR enables a not-illustrated third mover submitted to the conveyance path 104 after the second mover 101B to skip the mask supply chamber 109A and move directly to the first film formation chamber 107A. This can accelerate a film formation cycle. The mover 101A returned to the conveyance path 104 starts to move in the +X direction again to the mask supply chamber 109B that is a second mask supply chamber.

If the mask M is not reused, the mover 101A holds the mask M again and returns to the conveyance path 104 (FIG. 12B). The mover 101A returned to the conveyance path 104 moves in the −X direction and the −Y direction to the mask discharge chamber 119A. The mover 101A places the used mask M on the mask table in the mask discharge chamber 119A, and then moves in the +Y direction and the +X direction to the second mask supply chamber 109B.

The film forming operation on the mover 101B may be performed after or before the operation of the first mover 101A illustrated in FIG. 12A or 12B.

The movers 101 after the end of the film forming operation in the first film formation chamber 107A are subjected to film formation of another organic material layer in the second film formation chamber 107B using a different evaporation source from that in the first film formation chamber 107A. An article that is an electronic device is manufactured by repeating such film forming operations a plurality of times.

Figure 13A:
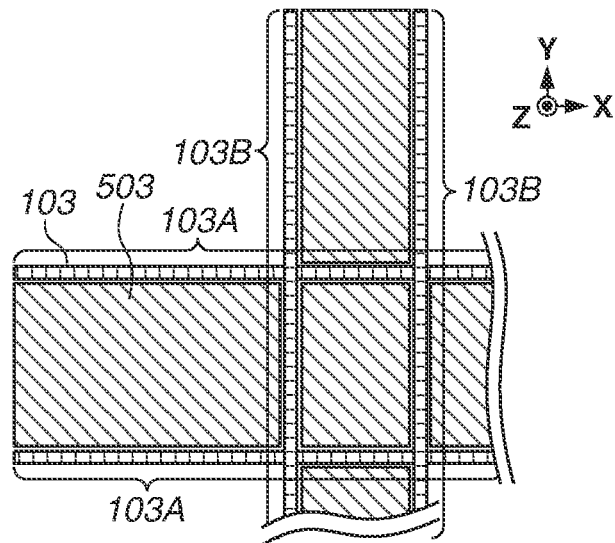
FIG. 13A is a schematic diagram illustrating a film forming system according to a second exemplary embodiment.
Figure 13B:
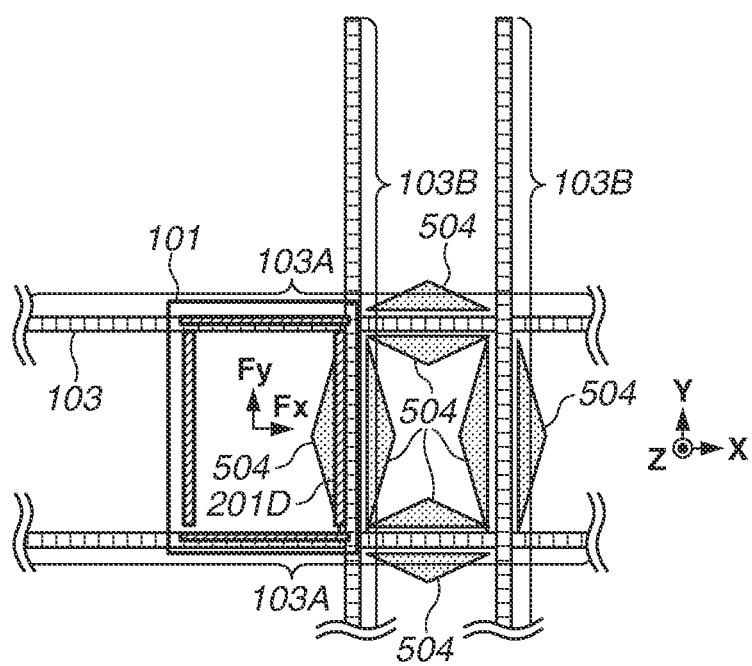
FIG. 13B is a schematic diagram illustrating the film forming system according to the second exemplary embodiment.
Figure 13C:
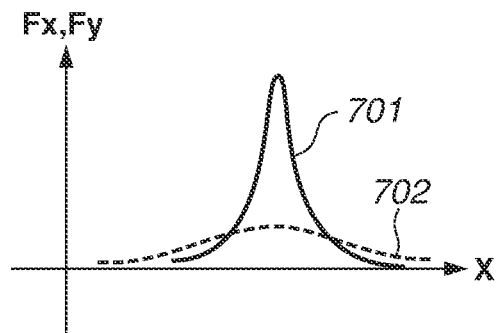
FIG. 13C is a diagram schematically illustrating the magnitude of forces in X and Y directions in moving a mover at a constant speed.

FIGS. 13A, 13B, and 13C are schematic diagrams for describing a film forming system according to a second exemplary embodiment.

In the second exemplary embodiment, similar to the first exemplary embodiment, movers 101 include permanent magnet groups, and stator groups 103 include armature groups. Armatures (coils) are copper wires wound around ferromagnetic cores. The use of such armatures produces a large attractive force between the armature groups and the magnetic members 201 even without an armature current. Thus, heavy movers can be conveyed with relatively low power.

In the configuration of FIG. 13A, magnetic members 503 that are ferromagnetic bodies are disposed even in areas where there is no stator group 103. Such disposition of the magnetic members 503 in the areas where there is no stator group 103 can reduce variations in attractive force of the stator groups 103 on a mover 101 over the conveyance path 104. This can reduce cogging force and reduce coil torque for conveyance, whereby conveyance can be stabilized.

In the configuration of FIG. 13B, magnetic members 504 that are ferromagnetic bodies are disposed near an intersection of stator groups 103. As illustrated in FIG. 13B, the magnetic members 504 have substantially triangular shapes. The magnitude of force acting on the mover 101, which is located at the illustrated position, in the X direction in such a configuration will be described. In this configuration, the magnetic member 201D undergoes a large attractive force in the +X direction from the stator group 103B. The magnetic member 201D also undergoes a force in the −X direction from the −X-side portion of the magnetic member 504. Thus, the forces acting on the magnetic member 201D in the X direction from the stator group 103B and from the magnetic member 504 are canceled. Thus, the force acting on the magnetic member 201D is reduced compared to a case where there is no magnetic members 504.

FIG. 13C is a diagram schematically illustrating the magnitudes of force Fx in the X direction and force Fy in the Y direction in conveying the mover 101 at a constant speed. If the magnetic members 504 are disposed near the intersection of the stator groups 103 as in the configuration of FIG. 13B, the attractive forces acting on the magnetic member 201D are canceled. This can reduce the force acting on the magnetic member 201D. Thus, as illustrated in FIG. 13C, the magnitudes of the forces Fx and Fy can be significantly reduced (702) compared to the case where there is no magnetic members 504 (701).

The configuration of the magnetic members 504 is not limited to the triangular shapes illustrated in FIG. 13B. For example, rectangular magnetic members 504 with gradually changing thicknesses can similarly reduce the variations in attractive force as with the triangular ones.

Thus, the torque for conveyance can be reduced by changing the shape of the magnetic members 504. This can simplify the configuration of the film forming system 1.

Other Exemplary Embodiments

The foregoing exemplary embodiments are merely examples of desirable configurations of the present disclosure, and the scope of the present disclosure is not limited to such configurations. Hardware configurations, software configurations, processing procedures, manufacturing conditions, dimensions, materials, and shapes of the apparatuses are not intended to limit the scope of the present disclosure thereto unless otherwise specified.

For example, in the present exemplary embodiment, the movers 101 are described to include permanent magnet groups, and the stator groups 103 are described to include armature groups including a plurality of coils. However, the relationship may be reversed. Specifically, the movers 101 may include armature groups, and the stator groups 103 may include permanent magnet groups. In such a case, each mover 101 includes a coil current control unit 402.

Figure 14:
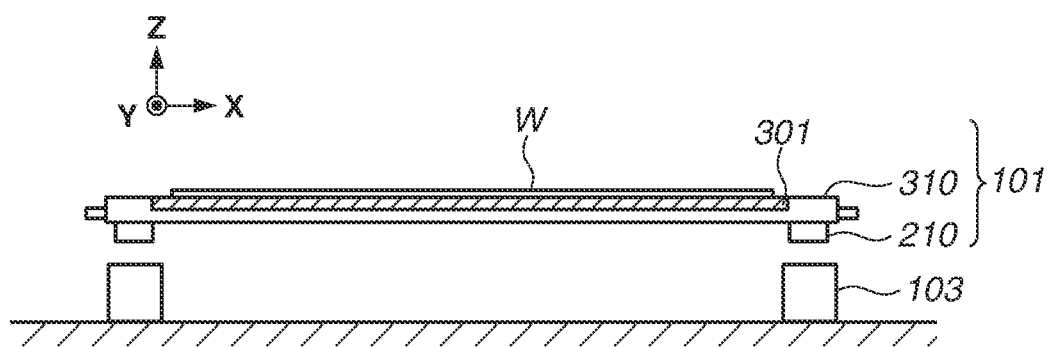
FIG. 14 is a schematic diagram illustrating a film forming system according to a modification.

In the first exemplary embodiment, the stator groups 103 are located above the magnetic members 201 of the movers 101. However, as illustrated in FIG. 14, the stator groups 103 may be located below the magnetic members 201. In such a case, the stator groups 103 produce a repulsive force between the stator groups 103 and the magnetic members 201. Thus, the movers 101 are conveyed in the X and Y directions while maintaining a non-contact state with the stator groups 103. In such a case, the stator groups 103 desirably use coreless coils having no core inside. In the case where the stator groups 103 and the magnetic members 201 are in such a positional relationship, the movers 101 may be configured to include armature groups and the stator groups 103 may be configured to include permanent magnet groups.

An exemplary embodiment of the present disclosure is suitable for forming evaporated films, or organic films in particular, on a film formation target such as a substrate. The film forming apparatus (system) is used to deposit a thin film on a substrate or a substrate having a laminate thereon in manufacturing various electronic devices, such as a semiconductor device, a magnetic device, and an electronic component, or optical components. More specifically, the film formation apparatus is suitably used in manufacturing electronic devices such as a light emitting element, a photoelectric conversion element, and a touch panel. For example, the film formation apparatus is suitably used in manufacturing organic light emitting elements such as an organic electroluminescence (EL) element, or organic photoelectric conversion elements such as an organic thin film solar cell. Examples of the electronic devices include a display device including light emitting elements (such as an organic EL display device), an illumination device (such as an organic EL illumination device), and a sensor including photoelectric conversion elements (such as an organic complementary metal-oxide-semiconductor (CMOS) image sensor).

According to the foregoing configurations, a series of processes for forming a film on a substrate using a mask can be performed in a shorter time than heretofore.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-205113, filed Dec. 10, 2020, which is hereby incorporated by reference herein in its entirety.

What is claimed is:

1. A film forming system comprising: a conveyance path extending in a first direction; a conveyance carrier configured to hold a substrate and a mask and move inside the conveyance path, the substrate including a film formation area, the mask being configured to shield a film non-formation area other than the film formation area; a conveyance unit disposed on the conveyance path and configured to move the conveyance carrier in the first direction and a second direction intersecting the first direction; a plurality of film formation units located along the conveyance path and configured to form a film on the film formation area of the substrate; a plurality of mask supply units located along the conveyance path and configured to supply the conveyance carrier with the mask, the plurality of film formation units include a first film formation unit and a second film formation unit, the plurality of mask supply units include a first mask supply unit and a second mask supply unit, and the first film formation unit and the first mask supply unit face each other across the conveyance path in the second direction, and the second film formation unit and the second mask supply unit face each other across the conveyance path in the second direction.

2. The film forming system according to claim 1, wherein the conveyance carrier is configured to horizontally hold the substrate and move inside the conveyance path in the first direction and the second direction.

3. The film forming system according to claim 1, further comprising a mask discharge unit, wherein the mask discharge unit adjoins the plurality of mask supply units and is located along the conveyance path.

4. The film forming system according to claim 1,
wherein the conveyance unit includes a first stator group including a plurality of first coils arranged in the first direction at predetermined distances, and a second stator group including a plurality of second coils arranged in the second direction at predetermined distances,
wherein the conveyance carrier includes a first magnetic member located at a position to face the first stator group, and a second magnetic member located at a position to face the second stator group, and
wherein the conveyance carrier is configured to be moved in the first and second directions by an electromagnetic force acting between the first stator group and the first magnetic member and an electromagnetic force acting between the second stator group and the second magnetic member.

5. The film forming system according to claim 4, wherein the conveyance carrier is configured to be levitated off the first and second stator groups and moved in the first and second directions by the electromagnetic force acting between the first stator group and the first magnetic member and the electromagnetic force acting between the second stator group and the second magnetic member.

6. The film forming system according to claim 4, wherein the plurality of film formation units and the plurality of mask supply units include the second stator group.

7. The film forming system according to claim 1, wherein each film formation unit of the plurality of film formation units is configured to accommodate a plurality of conveyance carriers.

* * * * *